United States Patent
Brown

(10) Patent No.: US 7,078,442 B2
(45) Date of Patent: *Jul. 18, 2006

(54) METHOD OF CONSOLIDATING SAND OR GRAVEL INTO A SOLID MASS

(75) Inventor: Scott A Brown, Spring, TX (US)

(73) Assignee: Baysystems North America LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/801,158

(22) Filed: Mar. 5, 2004

(65) Prior Publication Data

US 2004/0176491 A1 Sep. 9, 2004

Related U.S. Application Data

(60) Provisional application No. 60/452,765, filed on Mar. 7, 2003, provisional application No. 60/452,706, filed on Mar. 7, 2003.

(51) Int. Cl.
*C08G 18/28* (2006.01)

(52) U.S. Cl. ............... 521/130; 521/131; 521/164; 521/167; 521/170; 521/174; 528/48; 528/52; 528/58; 528/59; 528/76; 528/78; 528/85

(58) Field of Classification Search ........... 521/130, 521/131, 164, 167, 170, 174; 528/48, 52, 528/58, 59, 76, 78, 85
See application file for complete search history.

(56) References Cited

U.S. PATENT DOCUMENTS

| | | | |
|---|---|---|---|
| 3,983,064 A | 9/1976 | Olstowski | |
| 4,154,716 A | 5/1979 | Olstowski et al. | |
| 4,264,363 A | 4/1981 | Cech | |
| 4,567,708 A | 2/1986 | Haekkinen | |
| 4,608,208 A | 8/1986 | Yogo et al. | |
| 4,909,669 A | 3/1990 | Baker | |
| 5,208,271 A * | 5/1993 | Gallagher | 521/174 |
| 5,328,648 A | 7/1994 | McBrien et al. | |
| 5,489,405 A | 2/1996 | Holbert et al. | |
| 5,804,093 A | 9/1998 | Wyke et al. | |
| 5,900,195 A | 5/1999 | Pool et al. | |
| 5,951,796 A * | 9/1999 | Murray | 156/78 |
| 6,288,133 B1 | 9/2001 | Hagquist | |
| 6,402,201 B1 | 6/2002 | Pool et al. | |
| 6,521,673 B1 | 2/2003 | Brown | |

* cited by examiner

*Primary Examiner*—John M. Cooney, Jr.
(74) *Attorney, Agent, or Firm*—Joseph C. Gil; Lyndanne M. Whalen

(57) ABSTRACT

A composition and method for consolidating aggregate material is disclosed. The method includes introducing a reaction composition into the aggregate material and allowing it to reach on form a polymer which binds the aggregate together. The composition includes polyol, isocyanate, and ester.

13 Claims, No Drawings

US 7,078,442 B2

METHOD OF CONSOLIDATING SAND OR GRAVEL INTO A SOLID MASS

CROSS-REFERENCE TO RELATED APPLICATIONS

This application claims the benefit of the earlier filing date of U.S. Provisional Application No. 60/452,765, filed Mar. 7, 2003, and U.S. Provisional Application No. 60/452,706, filed Mar. 7, 2003, both of which are hereby incorporated by reference in their entirety for all purposes.

BACKGROUND OF THE INVENTION

1. Field of the Invention

The invention relates to a composition and method for consolidating aggregate (gravel, rocks, soil, sand, iron ore, wood chips, or other particulate solid material). More particularly, the invention relates to a composition including polyol, isocyanate, and ester, and a method for reacting the composition to form a polymer that consolidates aggregate together.

2. Description of the Related Art

As a result of the Alaskan hydrocarbon reserves, there is a significant amount of oil field related activities that occur on the Alaskan tundra. The Alaskan tundra typically comprises the following materials: salt water ice; fresh water ice; water or partly thawed ice; sand; gravel; bedrock; and cobble.

The tundra presents a number of problems for constructing or installing buildings, well heads, pipelines, drilling rigs, etc. As the permafrost freezes and thaws with changes in atmospheric conditions, the frozen tundra heaves, sinks and buckles. As a consequence, it is impractical to employ ordinary methods of building construction, as by erecting the building on poured concrete foundation walls, or on a poured concrete floor pad.

Additionally, as hydrocarbons flow upward in the well pipe toward a hydrocarbon well head, the warm hydrocarbons often melt the tundra's ice near the pipe. When the ice melts, the remaining gravel, rock, etc. simply falls to the nearest solid mass resulting in large caverns or sink holes around hydrocarbon wells. Additional gravel can be added to fill the holes, but continued melting can result in a continuing sink hole problem.

It has been known to inject a reacting composition into the ground underneath conventional slabs or floors. As discussed above, conventional slab construction cannot be used in environmental conditions such as the Alaskan tundra. U.S. Pat. No. 4,567,708 discloses a method wherein the components of an expanded polymeric foam, such as a closed cell polyurethane foam, are injected beneath the sunken or broken portion of an earth supported floor or slab. The space between the floor or slab and the earth is reached by drilling at least one hole through the floor or slab and injecting the components of the foam through the hole. As the foam expands between the earth and the floor or slab, a pressure is created, which forces the sunken or broken portion to rise. The hardened foam serves as a support for the previously sunken portion of slab or floor.

Another frequent construction issue occurring in many areas (not limited to the Alaskan tundra) is that temporary construction platforms, building foundations, or roads, etc. (collectively, surface bases) are often needed. The surface bases are frequently prepared by piling and compacting aggregate. One problem with using aggregate for surface bases is that there is little or no cohesiveness and the aggregate can become scattered decreasing the effectiveness of the base. To minimize this problem, some have applied heavy hydrocarbon products, etc. to the surface bases, but this can create numerous environmental problems.

BRIEF SUMMARY OF THE INVENTION

The present invention includes a reaction composition and method for reacting the composition to form a polymer that consolidates or solidifies aggregate. The preferred composition of the present invention includes polyol, isocyanate, and ester. The ester acts as a thinning agent in addition to excluding extraneous water from the reaction product. More preferably, the composition includes an A-side component including polymeric MDI and a B-side component including a polyol, catalyst, water, and 2,2,4-trimethyl-1,2-pentanediol diisobutyrate (sold by Eastman Chemical Company under the trademark TXIB). This preferred composition forms a foam that will consolidate aggregate. An alternative preferred embodiment includes the same components, but the water is substantially reduced or eliminated. Reacting this alternative reaction composition yields a solid or semi-solid polymer that consolidates aggregate. As compared to the heavy hydrocarbon products of the prior art, the TXIB with the polyurethanes provide a non hazardous, environmentally compatible binder.

The preferred method of the present invention includes injecting the reaction composition into an aggregate either above or below ground. The reaction composition infiltrates the aggregate and reacts to form a polymer binding the particles of aggregate together. When the reaction composition includes a blowing agent, the reaction composition expands through the aggregate creating a foam that binds the soil together. When the reaction composition does not include a blowing agent, the reaction composition flows into the aggregate creating a more dense or solid polymer that binds the aggregate together without displacing the aggregate.

DETAILED DESCRIPTION OF THE INVENTION

The present invention includes an improved composition and a method for reacting the composition to form a foam or other polymer that consolidates or solidifies aggregate.

The Composition

Generally, the composition comprises a polyol component (B-side), an isocyanate component (A-side), and ester component. The ester can be present in either the A-side, the B-side, or both. The ester acts as a thinning agent in addition to excluding extraneous water from the reaction product.

The ester is preferably a diester, and most preferably exemplified by, but not limited to, 2,2,4-trimethyl-1,3-pentanediol diiusobutyrate (sold by Eastman Chemical Company under the trademark TXIB). A particular advantage that a system utilizing TXIB has over the prior art systems is that it is non-hazardous and non-detrimental to the environment. The ester preferably is present in a range of from about 5 weight % to about 60 weight % of the total composition. The ester is more preferably present in the range of from about 10 weight % to about 25 weight %.

The isocyanate component of the composition can include isocyanates, polyisocyanates, or isocyanate prepolymers. Preferably, the isocyanate component is a polyisocyanate. The term polyisocyanate as used herein refers to any isocyanate having an average functionality greater than or equal to about 2.0. The polyisocyanate is preferably based on diphenylmethane diisocyanates such as those obtainable by aniline/formaldehyde condensation followed by phosgenation ("polymeric MDI") or derivatives of these polyisocyanates which may contain carbodiimide, biuret, urethane, isocyanurate, allophanate groups, and mixtures of compounds having these groups, and are liquid at room temperature. Preferred polyisocyanates are exemplified by, but not limited to, polymeric MDI sold by Bayer under the trademark MONDUR MR, by BASF under the trademark LUPRANATE M20S, by The Dow Chemical Company under the trademark PAPI 27 or by Huntsman Chemical under the trademark RUBINATE M.

Alternatively, an isocyanate homopolymer can be used in the composition if it is desired to produce an elastomeric polymer. Elastomeric polymers may be desired to provide some flexibility. A preferred polyisocyanate homopolymer for the preparation of an elastomeric producing composition is exemplified by, but not limited to, a 143 equivalent weight modified 4,4'-diphenylmethane diisocyanate such as MM 103 sold by BASF, MONDUR CD sold by Bayer, ISONATE 143L sold by The Dow Chemical Company or R 1680 sold by Huntsman Chemical.

Alternately, an isocyanate prepolymer can be used in the composition if it is desired to produce an elastomeric polymer. Preferred prepolymers include, but are not limited to MONDUR PF sold by Bayer, ISONATE 181 sold by The Dow Chemical Company, or R 1209 sold by Huntsman Chemical.

The polyol component of the composition can include a variety of polyols including polyether polyols, polyester polyols, or combinations. In the preferred embodiment, the polyol is a polyether polyol or combination of polyether polyols. More preferably, the polyol component includes a fast reacting amine based polyol. Preferred polyether polyols are exemplified by, but not limited to 40-770 (a tetrol, with a hydroxyl number average of 770) sold by Arch Performance Urethanes and Organics, or other equivalent such as QUADROL® sold by BASF. A similar polyol, VORANOL® 800, sold by The Dow Chemical Company can also be used. Additional polyols that can be used in the composition include Mannich® 466X sold by Huntsman or other equivalents such as Carpol® MX-470 sold by Carpenter Chemical or Voranol® 470X sold by The Dow Chemical Company. Additionally, polyglycols such as E-600 sold by The Dow Chemical Company and others can also be used in the composition.

In addition to the polyol component, the isocyanate component, and the ester, other components may be desired in various embodiments of the composition of the present invention. Catalysts, surfactants, water, and other blowing agents are non-limiting examples of additional components.

Preferably, a catalyst is used in the present invention. Preferred catalysts for use in the composition include, but are not limited to, organic tin compounds such as tin (II) octoate, dibutyl tin dilaurate, UL-22 (sold by Witco Chemical Organics Division under the trademark WITCO FOMREZ UL-22) or lead naphthenate (PbN); or tertiary amines such as N,N-dimethyl cyclohexylamine (DMCHA) sold as PolyCat 8 by Air Products & Chemicals, 1,4-diazabicyclo [2.2.2]octane (TEDA) sold under the tradename DABCO by Air Products & Chemicals, and 70% bis(dimethylaminoethyl)ether in DPG (sold as BL-11 by Air Products & Chemicals); or amine polyol catalysts such as 33% TEDA in glycol or dimethylethanolamine (DMEA); amine catalysts such as pentamethyldiethylenetriamine (PMDETA) sold as PolyCat 5 by Air Products & Chemicals. Other conventional amine and organometallic catalysts known for use in polyurethane forming reactions may be used.

Surfactants such as the polyether polysiloxanes known to be useful in polyurethane foam forming reactions may be used in the composition. Non-silicone surfactants may also be used. The non-silicone surfactants include, but are not limited to, LK443 (sold by Air Products). Suitable surfactants may be obtained from Goldschmidt Chemical, Air Products & Chemicals, Inc., Witco or others. Preferred surfactants for use in the composition include Y-10762 sold by OSI, B8423, B8934, and B8935 sold by Goldschmidt Chemical.

Preferably, the composition will include water. Water, may be added in a quantity of up to about 5% by weight, preferably up to about 4% by weight, and most preferably up to about 2% by weight based on the weight of polyisocyanate. Alternatively, other blowing agents can be used in combination with or as replacements for water. Organic blowing agents include, but are not limited to, non-ozone depleting hydrofluorocarbons, non-ozone depleting hydrochlorofluorocarbons and aliphatic hydrocarbons. Conventional blowing agents known for preparing water-blown and non-water blown polyurethanes may be used. The blowing agents may be used singly or in mixtures.

U.S. Pat. No. 6,521,673 describes many of the components that are suitable for use in the present composition. U.S. Pat. No. 6,521,673 is hereby incorporated by reference in its entirety for all purposes.

Preferably, the composition is reacted to form a closed cell foam. However, the composition can be reacted to form an open celled foam when better flow characteristics are desired. As discussed above, an elastomeric polymer can also be formed.

An example of a preferred composition includes an A-side comprising primarily polymeric MDI. The B-side of this preferred composition comprises about 35 weight % to about 45 weight % of an amine based polyether polyol, about 15 weight % to about 35 weight % of polyglycol, about 20 weight % to about 45 weight % TXIB, about 0.25 weight % to about 2.00 weight % surfactant, about 0.75 weight % to about 1.5 weight % water, and a combination of amine catalyst and tin catalyst of less than about 1.0 weight %. In this preferred embodiment, the A-side comprises about 50 weight % to about 60 weight % of the total composition and the B-side comprises about 40 weight % to about 50 weight %. Preferably, the components of this preferred composition are reacted to produce a foam that has a free rise density of between about 2 and about 8 pounds/cubic foot, most preferably about 4 pounds/cubic foot.

An example of an alternative preferred embodiment includes a composition using the same components and ranges of the previous paragraph, less the water component. Preferably, the components of this alternative preferred embodiment react to form a dense polymer rather than a foam.

The following non-limiting examples demonstrate preferred compositions for reacting and forming a polymer that consolidates or solidifies porous soil.

EXAMPLE 1

An experimental soil consolidation composition was prepared using the following components:

| B-Side Ingredients | Parts by Weight |
|---|---|
| 40-770 polyether polyol | 40.0 |
| 466X polyether polyol | 17.0 |
| Water | 1.40 |
| DMEA | 0.50 |
| Polycat 5 | 0.25 |
| UL-22 | 0.0125 |
| TXIB | 40.00 |
| B8423 surfactant | 1.0 |

The B-Side components were reacted with an A-side comprising polymeric MDI. The composition comprised 55.2 weight % A-side and 44.8 weight % B-side giving an isocyanate index of about 1.08. The reaction composition was injected into a container of very small diameter rocks. The resulting, reaction product was a foam having a free rise density of about 5 pounds/cubic foot. The foam did bind the rocks together.

EXAMPLE 2

When the liquid reaction composition of Example 1 was injected into the rocks, there was a tremendous effect on the reaction due to the heat sink inherent in the rock mass. A second experimental soil consolidation composition was prepared using the following components:

| B-Side Ingredients | Parts by Weight |
|---|---|
| 40-770 polyether polyol | 40.0 |
| E-600 | 32.0 |
| Water | 1.50 |
| Polycat 8 | 0.2 |
| Polycat 5 | 0.5 |
| TXIB | 25.00 |
| B8423 surfactant | 0.60 |

The amount of TXIB was decreased in the second example and the E-600 replaced a portion of the TXIB to give more polymer linkages to the mixture. The reaction composition was injected into a container of very small diameter rocks. The resulting reaction product was a foam having a free rise density of about 4 pounds/cubic foot. The foam did bind the rocks together.

EXAMPLE 3

The experiments above were repeated without using the water blowing agent. The finished rock/polymer mass was a solid, but the injection and reaction resulted in very little movement of the rock. That is, the reacting composition did not expand in place and push the rocks, but rather seeped around and infiltrated the space between the rocks.

The Method

The preferred method of the present invention generally includes introducing, by injection or otherwise, the reaction composition into aggregate, and allowing the composition to react and form a polymer binding the soil. The polymer formed by the reaction composition can be a foam or a solid polymer depending upon the specific components utilized as discussed above.

The A-side and B-side components of the composition are first added to aggregate. The A-side and B-side components can be premixed, injected by a reaction head, or combined and inserted using other techniques such as would be known to a person of ordinary skill in the art.

Once the composition has been injected into the aggregate, the components are allowed to react and form a polymer. Preferably, the reaction process is quick and polymer formation is substantially complete within a few minutes time.

The foregoing disclosure and description of the invention are illustrative and explanatory thereof, but to the extent foreseeable, the spirit and scope of the invention are defined by the appended claims.

We claim:

1. A method for consolidating aggregate material comprising:
   introducing a reaction composition into aggregate material; and
   allowing the composition to react and form a polymer;
   wherein the reaction composition comprises:
   polymeric MDI, and a B-Side component comprising between about 35 weight % to about 45 weight % of an amine based polyether polyol, about 15 weight % to about 35 weight % polyglycol, and about 20 weight % to about 45 weight % 2,2,4-trimethyl-1,3-pentanediol diisobutyrate.

2. The method of claim 1, wherein the composition further comprises an organic tin catalyst.

3. The method of claim 1, wherein the composition further comprises an amine catalyst.

4. The method of claim 1, wherein the composition further comprise water.

5. The method of claim 1, wherein the composition further comprises hydrofluorocarbon blowing agent.

6. The method of claim 1, wherein the composition further comprises hydrocarbon blowing agent.

7. The method of claim 1, wherein the composition further comprises a silicone based surfactant.

8. The method of claim 1, wherein the polymer comprises a polyurethane foam.

9. The method of claim 1, wherein the polymer comprises a polyurethane foam having a density of between about 2 and about 12 pounds per cubic foot.

10. The method of claim 1, wherein the polymer comprises an elastomeric polymer.

11. The method of claim 1, wherein the isocyanate comprises an isocyanate prepolymer.

12. The method of claim 1, wherein the composition is introduced below ground.

13. A reaction composition for consolidating aggregate, comprising:
    an A-side component comprising polymeric MDI; and
    a B-Side component comprising between about 35 weight % to about 45 weight % of an amine based polyether polyol, about 15 weight % to about 35 weight % of polyglycol, and about 20 weight % to about 45 weight % of 2,2,4-trimethyl-1,3-pentanediol diisobutyrate.

* * * * *